United States Patent
Yang et al.

(10) Patent No.: US 10,616,031 B2
(45) Date of Patent: Apr. 7, 2020

(54) APPARATUS AND METHODS FOR UNIFORM CONSTELLATIONS AND NON-UNIFORM CONSTELLATIONS IN WIRELESS LOCAL AREA NETWORKS

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US); Sameer Vermani, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/120,191

(22) Filed: Aug. 31, 2018

(65) Prior Publication Data

US 2019/0104011 A1  Apr. 4, 2019

Related U.S. Application Data

(60) Provisional application No. 62/566,987, filed on Oct. 2, 2017.

(51) Int. Cl.
*H04L 27/36* (2006.01)
*H04L 27/38* (2006.01)
(Continued)

(52) U.S. Cl.
CPC ............ *H04L 27/364* (2013.01); *H04L 27/34* (2013.01); *H04L 27/345* (2013.01); *H04L 27/38* (2013.01);
(Continued)

(58) Field of Classification Search
CPC ..... H04L 27/364; H04L 27/345; H04L 27/38; H04L 27/34; H04L 27/3405;
(Continued)

(56) References Cited

U.S. PATENT DOCUMENTS

2015/0010104 A1\* 1/2015 Park .................... H04B 7/0456
375/295
2016/0344493 A1 11/2016 Myung et al.
(Continued)

OTHER PUBLICATIONS

Hori S., et al., "System Capacity and Cell Radius Comparison with Several High Data Rate WLANs; 11-02-0159-01-0wng-system-capacity-and-cell-radius-comparison-with-several-high-data-rate-wlans," IEEE Draft; 11-02-0159-01-0WNG-System-Capacity-and-Cell-Radius-Comparison-With-Several-High-Data-Rate-WLANs IEEE-SA Mentor, Piscataway, NJ USA, vol. 802.11WNG SC, No. 1, Mar. 9, 2002, pp. 1-10, XP017692710.
(Continued)

*Primary Examiner* — Ted M Wang
(74) *Attorney, Agent, or Firm* — Muncy, Geissler, Olds & Lowe, P.C./Qualcomm

(57) ABSTRACT

This disclosure provides systems, devices, apparatus and methods, including computer programs encoded on storage media, for techniques for 4096 Quadrature Amplitude Modulation (4096-QAM) with Uniform Constellations and Non-uniform Constellations and 16384 Quadrature Amplitude Modulation (16384-QAM) with Uniform Constellations and Non-uniform Constellations in Wireless Local Area Networks (WLAN). These 4096-QAM and 16384-QAM techniques can be implemented in a QAM modulator circuit on the transmit side and in a QAM demodulator circuit on the receive side to increase peak data rate without the need for additional transmission power or bandwidth.

16 Claims, 11 Drawing Sheets

(51) Int. Cl.
*H04L 27/34* (2006.01)
*H04W 84/12* (2009.01)
*H04L 1/00* (2006.01)

(52) U.S. Cl.
CPC .......... *H04L 1/0003* (2013.01); *H04L 1/0009* (2013.01); *H04L 27/3405* (2013.01); *H04W 84/12* (2013.01)

(58) Field of Classification Search
CPC ................. H04L 27/362; H04L 1/0071; H04L 25/03834; H04L 1/0041; H04L 1/0003; H04L 1/0009; H04W 84/12
See application file for complete search history.

(56) References Cited

U.S. PATENT DOCUMENTS

2017/0033846 A1* 2/2017 Rende ................. H04B 7/0413
2017/0338996 A1* 11/2017 Sankar .................... H04L 27/20

OTHER PUBLICATIONS

International Search Report and Written Opinion—PCT/US2018/049364—ISA/EPO—dated Dec. 13, 2018.
Merritt R: "Startup Raises Ante in Comms | EE Times," Dec. 31, 2014, XP055529903, 4 pages, Retrieved from the Internet: URL: https://www.eetimes.com/document.asp?doc_id=1325121 [retrieved on Dec. 4, 2018].
Saif A., et al., "Frame Aggregation in Wireless Networks: Techniques and Issues," IETE Technical Review, vol. 28 (4), Jan. 1, 2011, 16 pages, XP055261028.
Xiao Y., et al., "Performance Analysis and Enhancement for the Current and Future IEEE 802.11 MAC Protocols," Mobile Computing and Communications Review, ACM, New York, NY, US, vol. 7 (2), Apr. 1, 2003, pp. 6-19, XP001503583.

* cited by examiner

APPARATUS AND METHODS FOR UNIFORM CONSTELLATIONS AND NON-UNIFORM CONSTELLATIONS IN WIRELESS LOCAL AREA NETWORKS

CROSS-REFERENCE TO RELATED APPLICATIONS

The present Application for Patent claims the benefit of U.S. Provisional Application No. 62/566,987, entitled "4096 Quadrature Amplitude Modulation (4096-QAM) with Uniform Constellations and Non-uniform Constellations and 16384 Quadrature Amplitude Modulation (16384-QAM) with Uniform Constellations and Non-uniform Constellations in Wireless Local Area Networks (WLAN)," filed Oct. 2, 2017, assigned to the assignee hereof, and expressly incorporated herein by reference in its entirety.

FIELD OF DISCLOSURE

This disclosure relates generally to wireless communications, and more specifically, to techniques for 4096 Quadrature Amplitude Modulation (4096-QAM) with Uniform Constellations and Non-uniform Constellations and 16384 Quadrature Amplitude Modulation (16384-QAM) with Uniform Constellations and Non-uniform Constellations in Wireless Local Area Networks (WLAN).

BACKGROUND

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish and/or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band and/or the 5 GHz band). As a result of the increasing ubiquity of wireless networks, a STA may have the opportunity to select one of many WLANs within range of the STA and/or select among multiple APs that together form an extended BSS. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

An important modulation technique utilized by these wireless systems is quadrature amplitude modulation (QAM). There remains a need for techniques to modulate and demodulate signals using higher order QAM to further increase the peak data rate. Accordingly, there is a need for systems, apparatus, and methods that overcome the deficiencies of conventional approaches including the methods, system and apparatus provided hereby.

SUMMARY

The systems, methods and devices of this disclosure each have several innovative aspects, no single one of which is solely responsible for the desirable attributes disclosed herein. The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a wireless communication device comprises: at least one antenna; a processor; and a memory communicatively coupled with the processor, the memory stores processor-readable code that, when executed by the processor, causes the wireless communication device to: generate a signal formatted in accordance with IEEE 802.11; modulate the generated signal with one of a 4096 Quadrature Amplitude Modulation (4096-QAM) or a 16384 Quadrature Amplitude Modulation (16384-QAM) to generate a modulated signal; and transmit the modulated signal.

In another aspect, a wireless communication device comprises: a plurality of antennas; a processor; and a memory communicatively coupled with the processor, the memory stores processor-readable code that, when executed by the processor, causes the wireless access point to: receive a signal formatted in accordance with IEEE 802.11; demodulate the received signal with one of a 4096 Quadrature Amplitude Modulation (4096-QAM) or a 16384 Quadrature Amplitude Modulation (16384-QAM) to generate at least one frame; and process the at least one frame.

In still another aspect, a method for wireless communication, the method comprises: generating a signal formatted in accordance with IEEE 802.11; modulating the generated signal by using one of a 4096 Quadrature Amplitude Modulation (4096-QAM) or a 16384 Quadrature Amplitude Modulation (16384-QAM) to generate a modulated signal; and transmitting the modulated signal.

In still another aspect, a non-transitory computer-readable storage medium comprising non-transitory processor-executable code operable to: generate a signal formatted in accordance with IEEE 802.11; modulate the generated signal with one of a 4096 Quadrature Amplitude Modulation (4096-QAM) or a 16384 Quadrature Amplitude Modulation (16384-QAM) to generate a modulated signal; and transmit the modulated signal.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
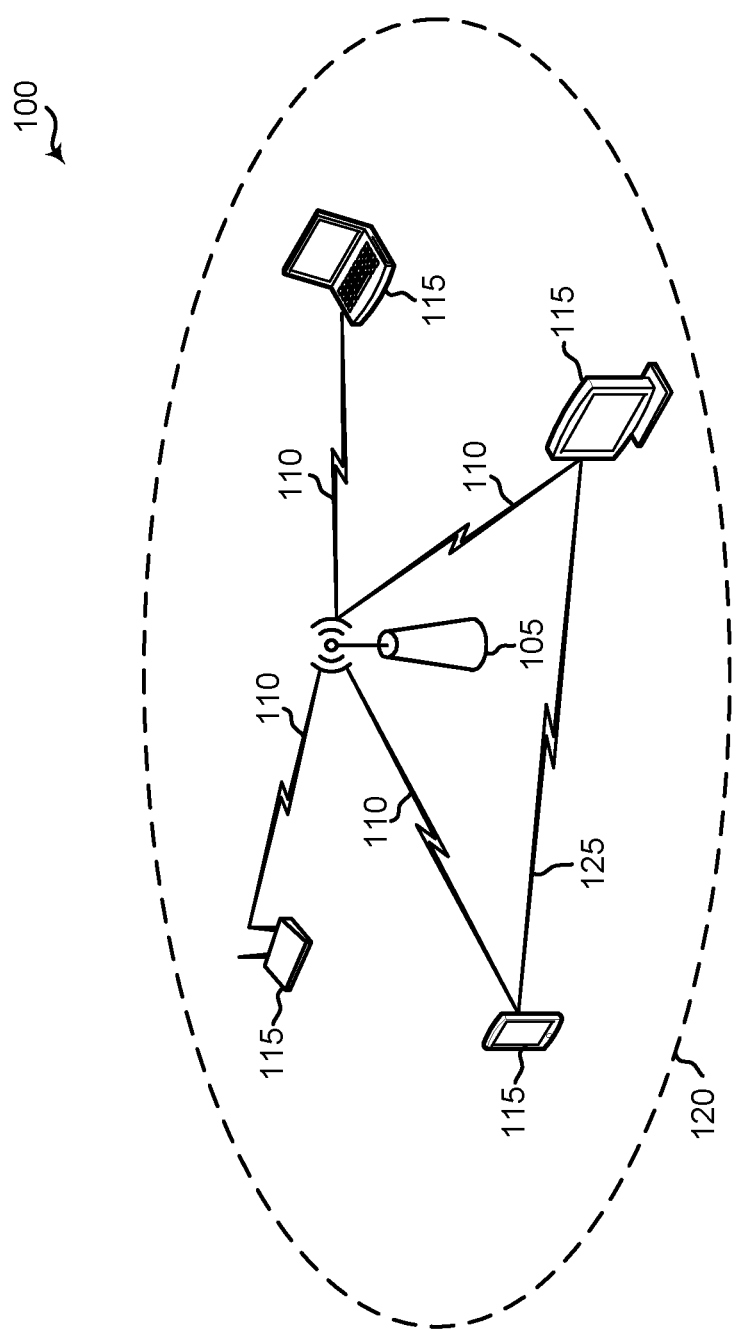
FIG. 1 illustrates a block diagram of an exemplary wireless communication system in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology. Various implementations relate generally to techniques for 4096 Quadrature Amplitude Modulation (4096-QAM) with Uniform Constellations and Non-uniform Constellations and 16384 Quadrature Amplitude Modulation (16384-QAM) with Uniform Constellations and Non-uniform Constellations in Wireless Local Area Networks (WLAN).

FIG. 1 shows a block diagram of an example wireless communication system 100. According to some aspects, the wireless communication system 100 can be an example of a wireless local area network (WLAN) (and will hereinafter be referred to as WLAN 100). For example, the WLAN 100 can be a network implementing at least one of the IEEE 802.11 families of standards. The WLAN 100 may include numerous wireless devices such as an access point (AP) 105 and multiple associated stations (STAs) 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the PHY and medium access control (MAC) layers. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, where multiple operators may have a license to operate in the same or overlapping frequency band or bands.

In some cases, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct wireless communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beam formed transmissions. As an example, AP 105 may use multiple antennas or antenna arrays to conduct beam forming operations for directional communications with a STA 115. Beam forming (which may also be referred to as spatial filtering or directional transmission) is a signal processing technique that may be used at a transmitter (e.g., AP 105) to shape and/or steer an overall antenna beam in the direction of a target receiver (e.g., a STA 115). Beam forming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (e.g., or antenna port) such that the desired beam forming effects are achieved. In some cases, these weights may be determined before beam forming can be employed. For example, the transmitter (e.g., the AP 105) may transmit one or more sounding packets to the receiver in order to determine CSI.

WLAN 100 may further support multiple-input, multiple-output (MIMO) wireless systems. Such systems may use a transmission scheme between a transmitter (e.g., AP 105) and a receiver (e.g., a STA 115), where both transmitter and receiver are equipped with multiple antennas. For example, AP 105 may have an antenna array with a number of rows and columns of antenna ports that the AP 105 may use for beam forming in its communication with a STA 115. Signals may be transmitted multiple times in different directions (e.g., each transmission may be beam formed differently). The receiver (e.g., STA 115) may try multiple beams (e.g., antenna sub-arrays) while receiving the signals.

WLAN PDUs may be transmitted over a radio frequency spectrum band, which in some examples may include multiple sub-bands or frequency channels. In some cases, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

Figure 2A:
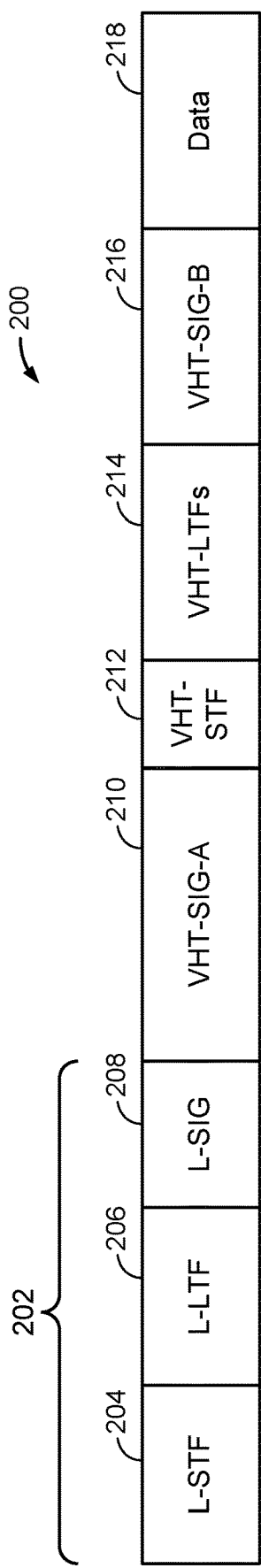
FIG. 2A illustrates an exemplary frame usable for communications between an access point (AP) and a number of stations (STAs) in accordance with some examples of the disclosure.

FIG. 2A shows an example frame 200 usable for communications between an AP and each of a number of stations identified by the AP. For example, the frame 200 can be formatted as a very high throughput (VHT) frame in accordance with the IEEE 802.11ac amendment to the IEEE 802.11 set of standards. The frame 200 includes a legacy preamble portion 202 that includes a legacy short training field (L-STF) 204, a legacy long training field (L-LTF) 206, and a legacy signaling field (L-SIG) 208. The frame 200 further includes a non-legacy preamble portion that includes a first very high throughput (VHT) signaling field (VHT-SIG-A) 210, a VHT short training field (VHT-STF) 212, a number of VHT long training fields (VHT-LTFs) 214 and a second VHT signaling field (VHT-SIG-B) 216. The frame 200 also can include a payload or data portion 218 after the preamble. The data portion 218 can include medium access control (MAC) protocol data units (MPDUs), for example, in the form of an aggregated MPDU (AMPDU).

The frame 200 may be transmitted over a radio frequency spectrum band, which may include a plurality of sub-bands. For example, the radio frequency spectrum band may have a bandwidth of 80 MHz, and each of the sub-bands may have a bandwidth of 20 MHz. When the radio frequency spectrum band includes a plurality of sub-bands, the L-STF, L-LTF, and L-SIG fields 204, 206 and 208, respectively, may be duplicated and transmitted in each of the plurality of sub-bands. The information in the VHT-SIG-A field 210 is also duplicated and transmitted in each sub-band.

The VHT-SIG-A field 210 may indicate to a station that the frame 200 is an IEEE 802.11ac frame. The VHT-SIG-A field 210 also may include VHT WLAN signaling information usable by stations other than the number of stations that are identified to receive downlink communications in the frame 200. The VHT-SIG-A field 210 also includes information usable by the identified number of stations to decode the VHT-SIG-B field 216. The VHT-SIG-B field 216 may include VHT WLAN signaling information usable by the number of stations identified to receive downlink communications in the frame 200. More specifically, the VHT-SIG-B field 216 may include information usable by the number of stations to decode data received in the data portion 218. The VHT-SIG-B field 216 may be encoded separately from the VHT-SIG-A field 210. The number of VHT-LTFs 214 depends on the number of transmitted streams.

Figure 2B:
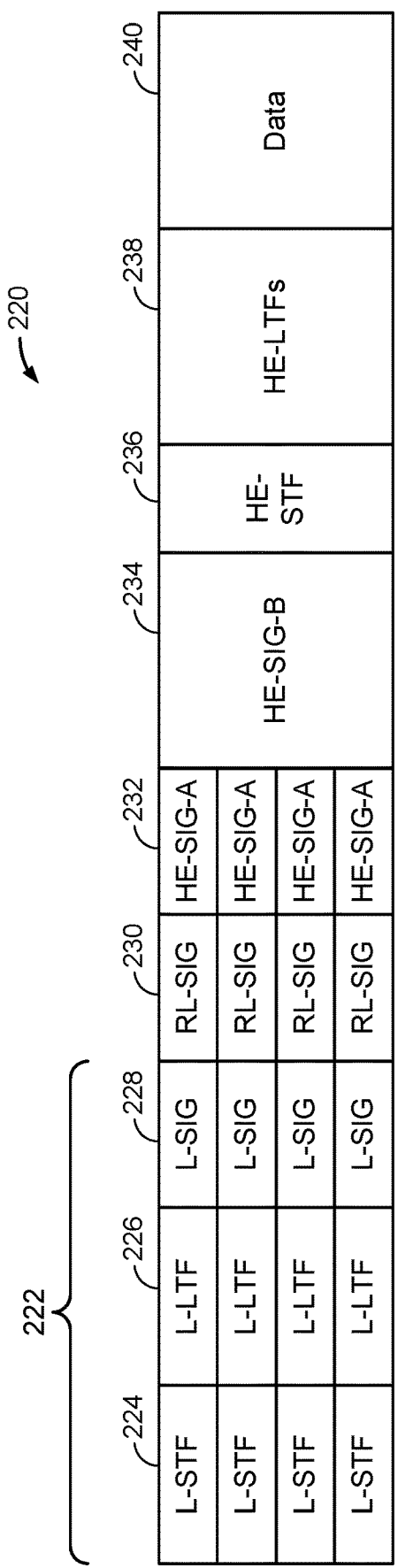
FIG. 2B illustrates an exemplary frame usable for communications between an AP and a number of STAs in accordance with some examples of the disclosure.

FIG. 2B shows an example frame 220 usable for communications between an AP and each of a number of stations identified by the AP. For example, the frame 220 can be formatted as a high efficiency (HE) frame in accordance with the IEEE 802.11ax amendment to the IEEE 802.11 set of standards. The frame 220 includes a legacy preamble portion 222 that includes a legacy short training field (L-STF) 224, a legacy long training field (L-LTF) 226, and a legacy signaling field (L-SIG) 228. The frame 220 further includes a non-legacy preamble portion that includes a repeated legacy signaling field (RL-SIG) 230, a first high efficiency signaling field (HE-SIG-A) 232, a second high efficiency signaling field (HE-SIG-B) 234, a high efficiency short training field (HE-STF) 236 and a number of high efficiency long training fields (HE-LTFs) 238. The frame 220 also can include a payload or data portion 240 after the preamble. The data portion 240 can include medium access control (MAC) protocol data units (MPDUs), for example, in the form of an aggregated MPDU (AMPDU).

The frame 220 may be transmitted over a radio frequency spectrum band, which may include a plurality of sub-bands. For example, the radio frequency spectrum band may have a bandwidth of 80 MHz, and each of the sub-bands may have a bandwidth of 20 MHz. When the radio frequency spectrum band includes a plurality of sub-bands, the L-STF, L-LTF, and L-SIG fields 224, 226 and 228, respectively, may be duplicated and transmitted in each of the plurality of sub-bands. The information in the RL-SIG field 230 and the HE-SIG-A field 232 is also duplicated and transmitted in each sub-band as shown in FIG. 2B.

The RL-SIG field 230 may indicate to a station that the frame 220 is an IEEE 802.11ax frame. The HE-SIG-A field 232 may include high efficiency WLAN signaling information usable by stations other than the number of stations that are identified to receive downlink communications in the frame 220. The HE-SIG-A field 232 may also include information usable by the identified number of stations to decode the HE-SIG-B field 234. The HE-SIG-B field 234 may include high efficiency WLAN signaling information usable by the number of stations identified to receive downlink communications in the frame 220. More specifically, the HE-SIG-B field 234 may include information usable by the number of stations to decode data received in the data portion 240. The HE-SIG-B field 234 may be encoded separately from the HE-SIG-A field 232.

High efficiency (HE) WLAN (HEW) preambles can be used to schedule multiple devices, such as STAs 115, for multi-user simultaneous transmissions (for example, using multi-user orthogonal frequency division multiple access (MU-OFDMA) or multi-user multiple-input, multiple-output (MU-MIMO) techniques). A HEW signaling field may be used to signal a resource allocation pattern to multiple receiving STAs 115. The HEW signaling field can include a common user field that is decodable by multiple STAs 115, as well as a resource allocation field. The resource allocation field can indicate resource unit distributions to multiple STAs 115 and indicate which resource units in a resource unit distribution correspond to MU-MIMO transmissions and which resource units correspond to OFDMA transmissions. The HEW signaling field also can include, subsequent to the common user field, dedicated station-specific signaling fields that are assigned to particular STAs 115 and used to schedule resources and to indicate the scheduling to other WLAN devices.

In some cases, aspects of transmissions may vary based on a distance between a transmitter (for example, AP 105) and a receiver (for example, STA 115). WLAN 100 may otherwise generally benefit from AP 105 having information regarding the location of the various STAs 115 within coverage area 120. In some examples, relevant distances may be computed using RTT-based ranging procedures. As an example, WLAN 100 may offer such functionality that produces accuracy on the order of one meter (or even centimeter-level accuracy). The same (or similar) techniques employed in WLAN 100 may be applied across other radio access technologies (RATs). For example, such RTT-based ranging functionality may be employed in developing "relative geo-fencing" applications (i.e., applications where there is a geo-fence relative to an object of interest such as a mobile device, a car, a person, etc.). Various such examples are considered in accordance with aspects of the present disclosure. For example, car keys may employ RTT estimation for PKES systems. RTT-based geo-fences around an adult may monitor the position of a child within the geo-fence. Additionally, drone-to-drone and car-to-car RTT functionality may help prevent collisions.

Figure 3:
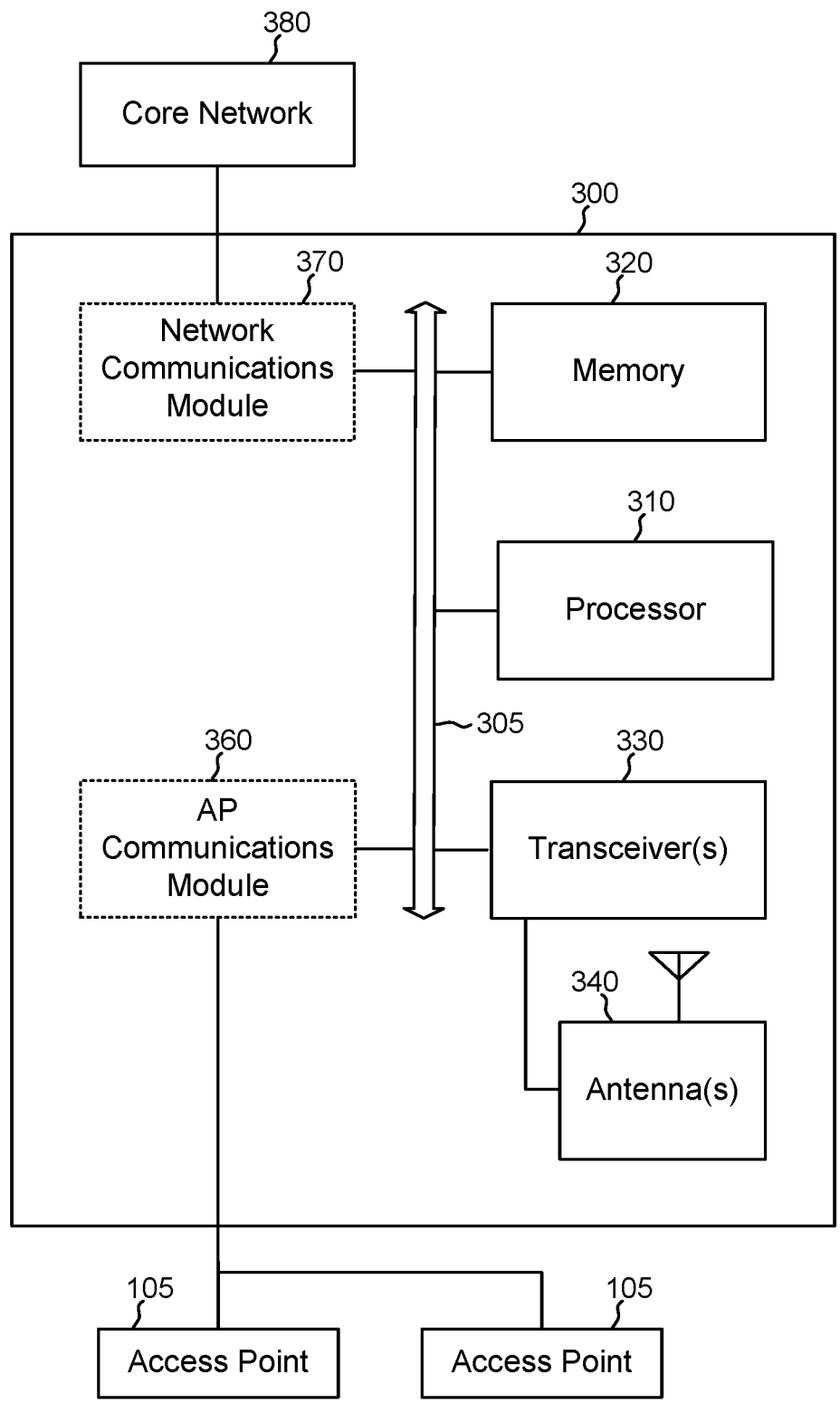
FIG. 3 illustrates a block diagram of an exemplary AP for use in wireless communication in accordance with some examples of the disclosure.

FIG. 3 shows a block diagram of an example access point (AP) 300 for use in wireless communication. For example, the AP 300 may be an example of aspects of the AP 105 described with reference to FIG. 1. The AP 300 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 300 includes a processor 310, a memory 320, at least one transceiver 330 and at least one antenna 340. In some implementations, the AP 300 also includes one or both of an AP communications module 360 and a network communications module 370. Each of the components (or "modules") described with reference to FIG. 3 can communicate with one another, directly or indirectly, over at least one bus 305.

The memory 320 can include random access memory (RAM) and read-only memory (ROM). The memory 320 also can store processor- or computer-executable software (SW) code containing instructions that, when executed by the processor 310, cause the processor to perform various functions described herein for wireless communication, including generation and transmission of a downlink frame and reception of an uplink frame.

The processor 310 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 310 processes information received through the transceiver 330, the AP communications module 360, and the network communications module 370. The processor 310 also can process information to be sent to the transceiver 330 for transmission through the antenna 340, information to be sent to the AP communications module 360, and information to be sent to the network communications module 370. The processor 310 can generally be configured to perform various operations related to generating and transmitting a downlink frame and receiving an uplink frame.

The transceiver 330 can include a modem to modulate packets and provide the modulated packets to the antenna 340 for transmission, as well as to demodulate packets received from the antenna 340. The transceiver 330 can be implemented as at least one radio frequency (RF) transmitter and at least one separate RF receiver. The transceiver 330 can communicate bi-directionally, via the antenna 340, with at least one STA 115 as, for example, shown in FIG. 1. Although only one transceiver 330 and one antenna 340 are shown in FIG. 3, the AP 300 can typically include multiple transceivers 330 and antennas 340. For example, in some AP implementations, the AP 300 can include multiple transmit antennas (each with a corresponding transmit chain) and multiple receive antennas (each with a corresponding receive chain). The AP 300 may communicate with a core network 380 through the network communications module 370. The system also may communicate with other APs, such as APs 105, using the AP communications module 360.

Figure 4:
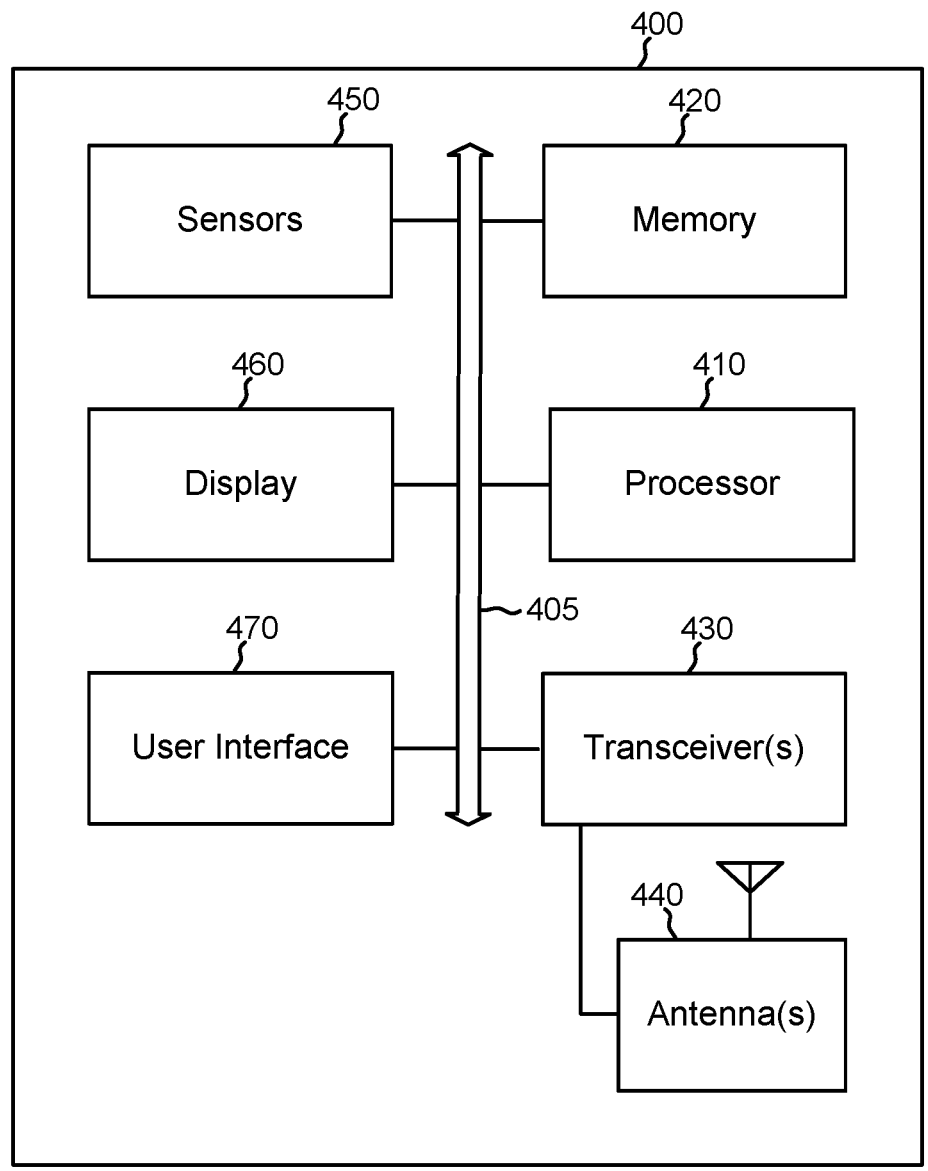
FIG. 4 illustrates a block diagram of an exemplary STA for use in wireless communication in accordance with some examples of the disclosure.

FIG. 4 shows a block diagram of an example wireless station (STA) 400 for use in wireless communication. For example, the STA 400 may be an example of aspects of the STA 115 described with reference to FIG. 1. The STA 400 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 400 includes a processor 410, a memory 420, at least one transceiver 430 and at least one antenna 440. In some implementations, the STA 400 additionally includes one or more of sensors 450, a display 460 and a user interface (UI) 470 (such as a touchscreen or keypad). Each of the components (or "modules") described with reference to FIG. 4 can communicate with one another, directly or indirectly, over at least one bus 405.

The memory 420 can include RAM and ROM. The memory 420 also can store processor- or computer-executable SW code containing instructions that, when executed, cause the processor 410 to perform various functions described herein for wireless communication, including reception of a downlink frame and generation and transmission of an uplink frame.

The processor 410 includes an intelligent hardware device such as, for example, a CPU, a microcontroller, an ASIC or a PLD such as an FPGA, among other possibilities. The processor 410 processes information received through the transceiver 430 as well as information to be sent to the transceiver 430 for transmission through the antenna 440. The processor 410 can be configured to perform various operations related to receiving a downlink frame and generating and transmitting an uplink frame.

The transceiver 430 can include a modem to modulate packets and provide the modulated packets to the antenna 440 for transmission, as well as to demodulate packets received from the antenna 440. The transceiver 430 can be implemented as at least one RF transmitter and at least one separate RF receiver. The transceiver 430 can communicate bi-directionally, via the antenna 440, with at least one STA 115 as, for example, shown in FIG. 1. Although only one transceiver 430 and one antenna 440 are shown in FIG. 4, the STA 400 can include two or more antennas. For example, in some STA implementations, the STA 400 can include multiple transmit antennas (each with a corresponding transmit chain) and multiple receive antennas (each with a corresponding receive chain).

Figure 5:
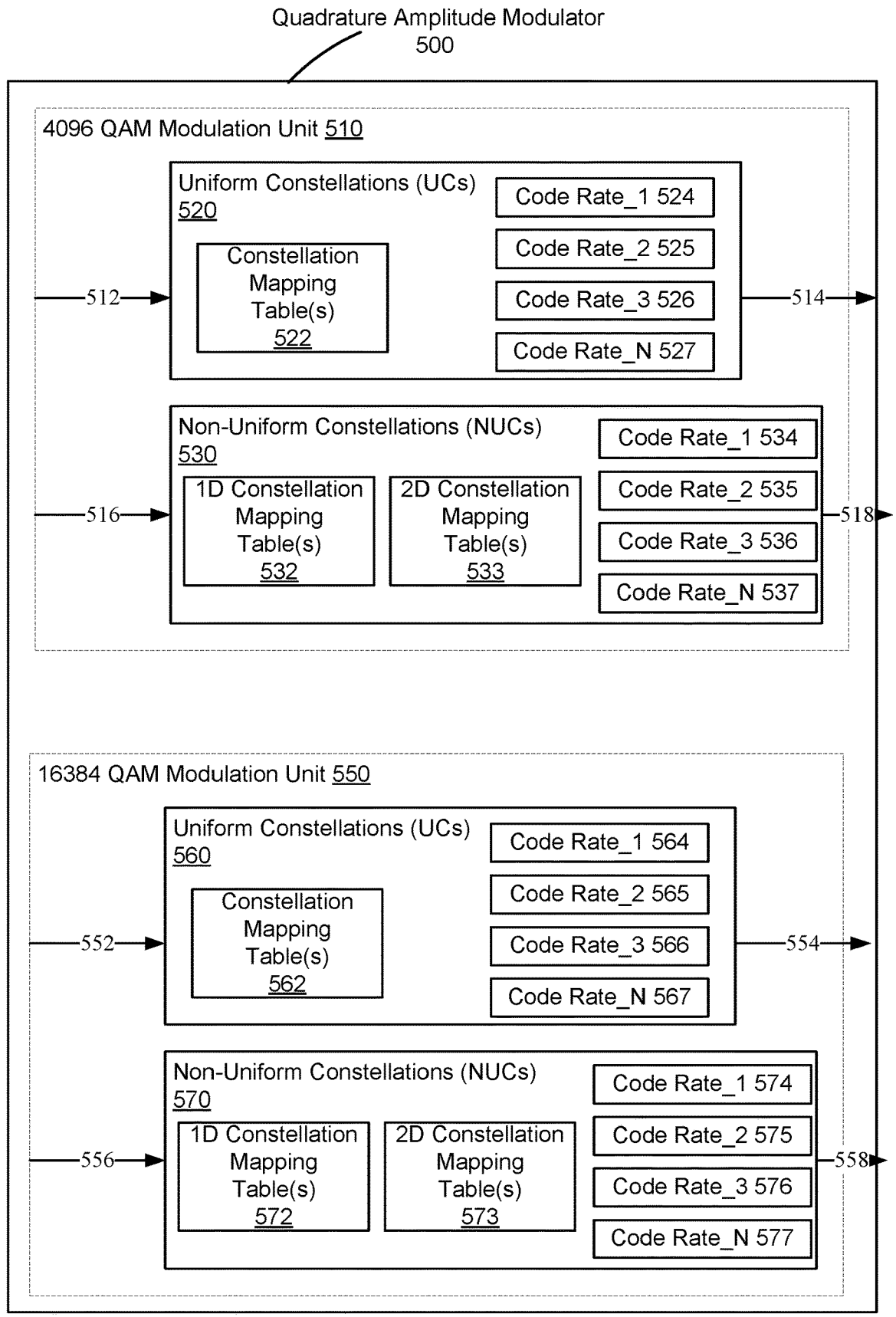
FIG. 5 illustrates a block diagram of an exemplary apparatus for 4096 Quadrature Amplitude Modulation (4096-QAM) with Uniform Constellations or with Non-Uniform Constellations and for 16384 Quadrature Amplitude Modulation (16384-QAM) with Uniform Constellations or with Non-Uniform Constellations in accordance with some examples of the disclosure.
Figure 6:
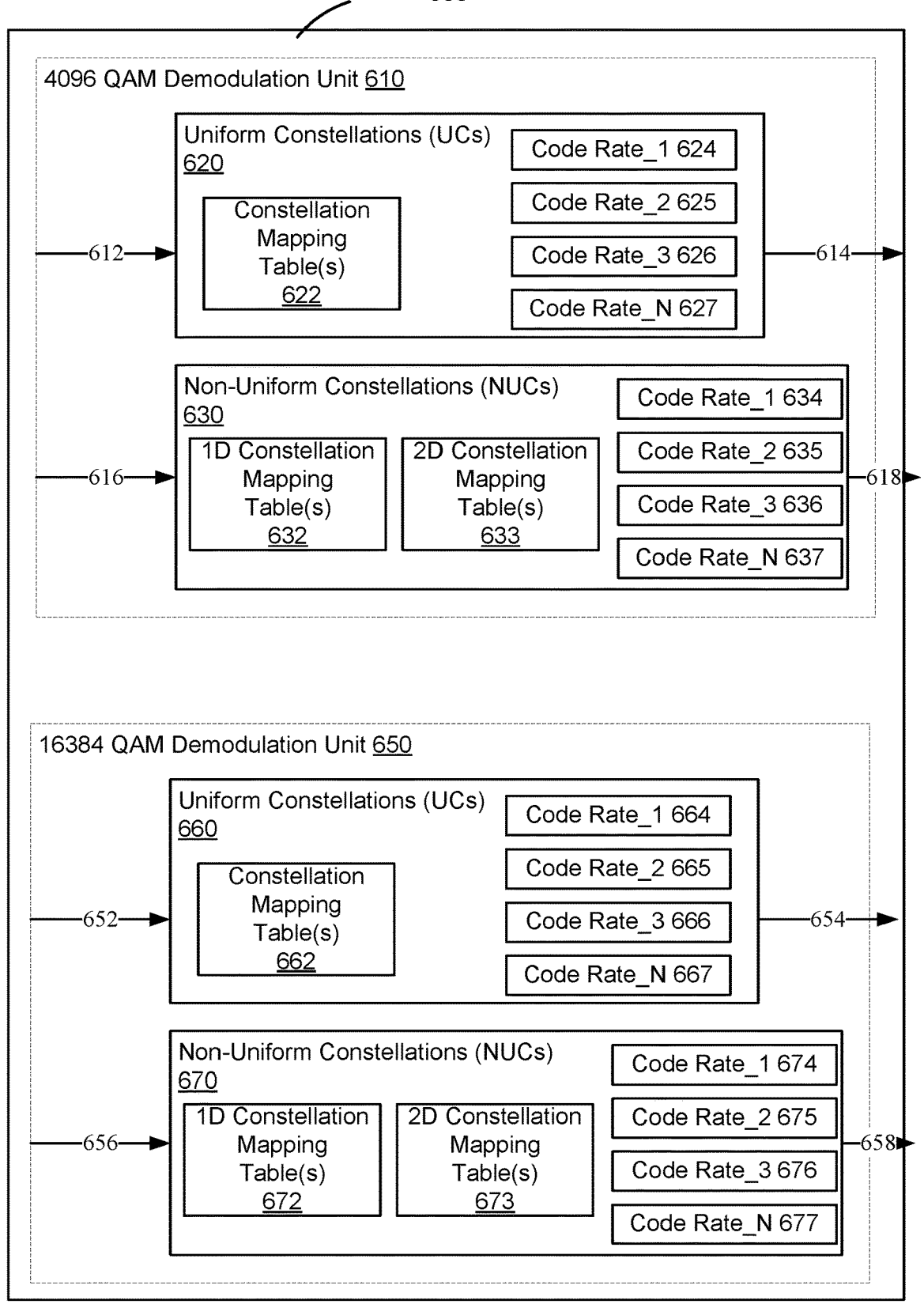
FIG. 6 illustrates a block diagram of an exemplary apparatus for demodulating a 4096 Quadrature Amplitude De-Modulation (4096-QAM) modulated signal or a 16384 Quadrature Amplitude Modulation (16384-QAM) modulated signal in accordance with some examples of the disclosure.

FIGS. 5 and 6 show block diagrams of an exemplary QAM modulator circuit and QAM demodulator circuit for use in wireless communication according to some implementations. In some implementations, the QAM modulator circuit and QAM demodulator circuit can be implemented in the APs 105 and 300 described above with respect to FIGS. 1 and 3, respectively. In some other implementations, the QAM modulator circuit and QAM demodulator circuit can be implemented in STAs 115 and 400 described above with respect to FIGS. 1 and 4, respectively (for example, in implementations in which such STAs are operable to function as "soft APs," "virtual APs" or "mobile hotspots" to provide network access to other STAs).

Figure 7:
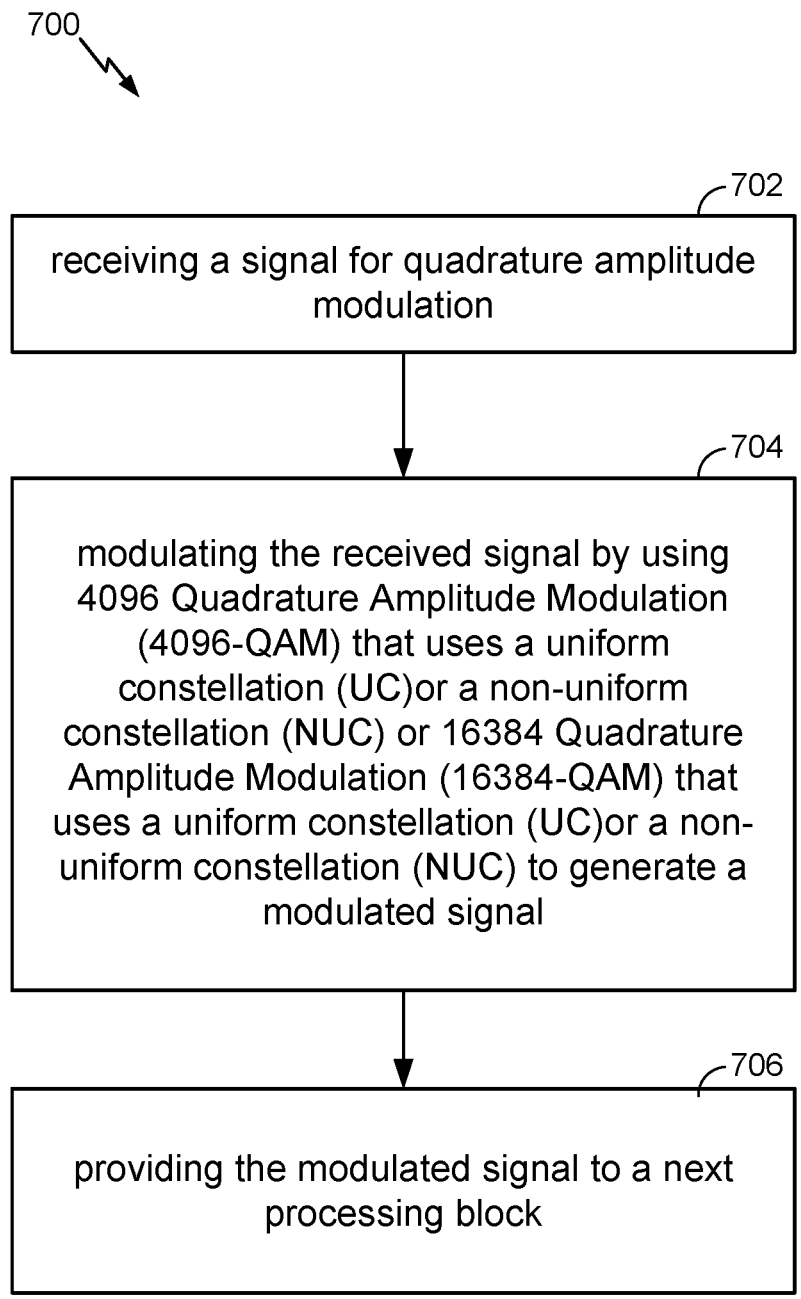
FIG. 7 illustrates a flowchart illustrating an exemplary partial process for 4096 Quadrature Amplitude Modulation (4096-QAM) with Uniform Constellations or Non-uniform constellations or 16384 Quadrature Amplitude Modulation (16384-QAM) with Uniform Constellations or Non-uniform constellations in accordance with some examples of the disclosure.
Figure 8:
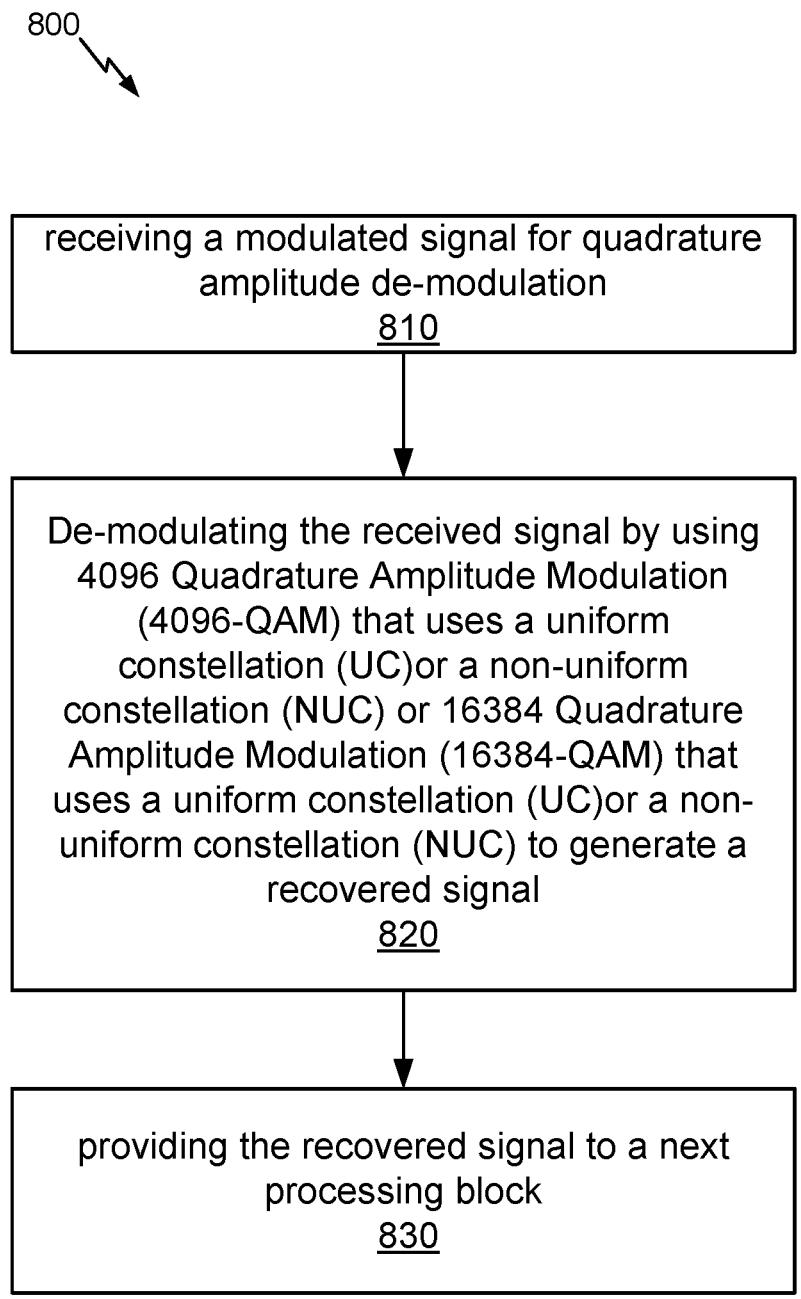
FIG. 8 illustrates a flowchart illustrating an exemplary partial process for demodulating a 4096 Quadrature Amplitude Modulation (4096-QAM) modulated signal or a 16384 Quadrature Amplitude Modulation (16384-QAM) modulated signal according to some implementations.

In some implementations, each of the components illustrated in FIGS. 7 and 8 are implemented as software stored in a memory (such as the memory 320). For example, each of the modules can be implemented as non-transitory instructions (or "code") executable by a processor (such as the processor 310). For example, the processor 310 can execute the modules to implement one or more techniques for 4096 QAM and 16384 QAM modulation and de-modulation.

Two constellation types for 4096 QAM and 16384 QAM for wireless local area networks (WLAN) are described herein below. These two constellation types are Uniform constellations (UCs) and Non-uniform constellations (NUCs).

For 4096 QAM (M=4096) and 16384 QAM (M=16384), the number of coded bits per subcarrier per spatial stream ($N_{BPSCS}$) is calculated by the following expression: $N_{BPSCS}=\log 2 (M)$. The constellation map includes uniformly distributed constellation points: S=I+jQ, I & Q∈{−

$\{-(\sqrt{M}-1), -(\sqrt{M}-3), \ldots, \sqrt{M}-1\}$. Normalization may be calculated by the following expression:

$$S_{Norm} = \frac{S}{\sqrt{\frac{2(M-1)}{3}}}.$$

The gray mapping for I and Q follows the extension rule as set forth herein: graymap_k=[graymap_{k−1}, ($\sqrt{M}/2$)+graymap_{k−1}(end:−1:1)], k=$N_{BPSCS}$/2.

In this manner, the gray mapping for 4096 QAM may be derived using the above rule from that for 1024 QAM. Similarly, the gray mapping for 16384 QAM may be derived using the above rule from that for 4096 QAM.

The following two examples are provided to illustrate this mapping. From QPSK to 16QAM: graymap_1=[0, 1]→graymap_2=[0, 1, 3, 2]=[[0, 1], 2+[1, 0]]. From 16QAM to 64QAM: map_2=[0, 1, 3, 2]→map_3=[0, 1, 3, 2, 6, 7, 5, 4]=[[0, 1, 3, 2], 4+[2, 3, 1, 0]]. For 4096 QAM, b0b1b2b3b4b5 determines the I value and b6b7b8b9b10b11 determines the Q value, using same mapping table wherein b0 and b6 are MSBs for I and Q respectively, b5 and b11 are LSBs for I and Q respectively. In addition, gray mapping for b0b1b2b3b4b5 and b6b7b8b9b10b11 for 4096QAM is graymap_6=[graymap_5, 32+graymap_5 (end:−1:1)]; where graymap_5 is the gray mapping table for 1024QAM. Also, for each b0b1b2b3b4b5=graymap_6(n), I value=I(n), where I=[−63, −61, . . . , 63] and for each b6b7b8b9b10b11=graymap_6(n), Q value=Q(n), where Q=[−63, −61, . . . , 63].

For 16384 QAM, b0b1b2b3b4b5b6 determines the I value and b7b8b9b10b11b12b13 determines the Q value, using same mapping table wherein b0 and b7 are MSBs for I and Q respectively, b6 and b13 are LSBs for I and Q respectively. In addition, gray mapping for b0b1b2b3b4b5b6 and b7b8b9b10b11b12b13 for 16384QAM is graymap_7=[graymap_6, 64+graymap_6 (end:−1:0]; where graymap_6 is the gray mapping table for 4096QAM. Also, for each b0b1b2b3b4b5b6=graymap_7(n), I value=I(n), where I=[−127, −125, . . . , 127] and for each b7b8b9b10b11b12b13=graymap_7(n), Q value=Q(n), where Q=[−127, −125, . . . , 127].

By using the extension rule as set forth above, the current IEEE 802.11a/n/ac/ax MCS mode may be extended to include 4096 QAM and 16384 QAM. In one example, a same constellation mapping table can be utilized to generate I (the in-phase component) and Q (the quadrature-phase component). In another example, the same constellation can be used for multiple code rates. For example, the same 4096 QAM constellation can be used for code rate 3/4, code rate 5/6, code rate 7/8. Similarly, the same 16384 QAM constellation can be used for code rate 3/4, code rate 5/6, code rate 7/8.

It should be understood that one dimensional NUCs (1D-NUCs) may be used for 4096QAM and 16384QAM to limit the complexity at the receiver side. Use of 1D-NUCs may provide a high level of symmetry, amplitude levels of real and imaginary part are the same, bit labels of real and imaginary part can be separated and, for higher order QAM, constellation points may be compressed around origin but spread out/have larger distance at the edges. Use of two dimensional NUCs (2D-NUCs) may provide quadrant symmetry, amplitude levels of real and imaginary part are independent, bit labels cannot be separated between real and imaginary part, and different NUCs for each code rate may be required.

Table I illustrates an MCS extension to current 802.11ax. See, for example, the last six rows, which are directed to 4096 QAM with code rate 3/4, 5/6, 7/8 and 16384 QAM with code rate 3/4, 5/6, 7/8. With higher order QAM (e.g., 4096 QAM and 16384 QAM), there is significant improvement in the data rate. For example, as compared to 1024 QAM with code rate 5/6, 4096 QAM (with 12 bits per symbol) with code rate 5/6 shows approximately a 20% improvement in data rate, and 16384 QAM (with 14 bits per symbol) with code rate 5/6 shows approximately a 40% improvement in data rate. The 4096 QAM and 16384 QAM techniques proposed herein further increase peak data rate without the need for additional transmission power or bandwidth.

TABLE I

| Efficiency (bps/Hz) | 11a- Bit Rate (Mbps) | Code rate | Modulation |
|---|---|---|---|
| 0.5 | 6 | 1/2 | BPSK |
| 1.0 | 12 | 1/2 | QPSK |
| 1.5 | 18 | 3/4 | QPSK |
| 2.0 | 24 | 1/2 | 16 QAM |
| 3.0 | 36 | 3/4 | 16 QAM |
| 4.0 | 48 | 2/3 | 64 QAM |
| 4.5 | 54 | 3/4 | 64 QAM |
| 5.0 | 60 | 5/6 | 64 QAM |
| 6.0 | 72 | 3/4 | 256 QAM |
| 6.67 | 80 | 5/6 | 256 QAM |
| 7.5 | 90 | 3/4 | 1024 QAM |
| 8.33 | 100 | 5/6 | 1024 QAM |
| 9 | 108 | 3/4 | 4096 QAM |
| 10 | 120 | 5/6 | 4096 QAM |
| 10.5 | 126 | 7/8 | 4096 QAM |
| 10.5 | 126 | 3/4 | 16384 QAM |
| 11.67 | 140 | 5/6 | 16384 QAM |
| 12.25 | 147 | 7/8 | 16384 QAM |

FIG. 5 shows a block diagram of an example apparatus for 4096 Quadrature Amplitude Modulation (4096-QAM) with Uniform Constellations or with Non-Uniform Constellations and for 16384 Quadrature Amplitude Modulation (16384-QAM) with Uniform Constellations or with Non-Uniform Constellations according to an example. The Quadrature Amplitude Modulator 500 includes a 4096-QAM Modulation Unit 510 for performing 4096 Quadrature Amplitude Modulation on input signals (e.g., signals 512, 516 also referred to herein as received signals) received from a previous processing block (e.g., error correction block) and a 16384-QAM Modulation Unit 550 for performing 4096 Quadrature Amplitude Modulation on input signals (e.g., signals 552, 556 also referred to herein as received signals) received from a previous processing block (e.g., error correction block).

The 4096-QAM Modulation Unit 510 includes uniform constellations (UCs) 520 and non-uniform constellations (NUCs) 530. UCs 520 can include one or more constellation mapping tables 522. Each UC 520 can be implemented with an associated constellation mapping table 522 that maps the input signal 512 to a constellation point 514 in a constellation map. In one example, a particular UC 520 can be associated with more than one code rate. In one example, a particular UC 520 is associated with code rate_1 524 and code rate_2 525. In another example, a particular UC 520 is associated with code rate_1 524, code rate_2 525, code rate_3 526, and code rate_N 527 etc.). Design considerations for selecting between UC and NUC and also between 1D NUC and 2D NUC are described in greater detail hereinafter.

NUCs 530 can include one-dimensional (1D) constellation mapping tables 532 and two-dimensional (2D) constellation mapping tables 533. A NUC 530 can be implemented with an associated constellation mapping table 532 or 533 that maps the input signal 516 to a constellation point 518 in a constellation map. In one example, a particular NUC 530 is associated with its own code rate. In one example, a first NUC 530 is associated with code rate_1 534 and a second NUC 530 is associated with code rate_2 535. In another example, a first NUC 530 is associated with code rate_1 534, a second NUC 530 is associated with code rate_2 535, and a third NUC 530 is associated code rate_3 536.

The 16384-QAM Modulation Unit 550 includes uniform constellations (UCs) 560 and non-uniform constellations (NUCs) 570. Each UC 560 can be implemented with an associated constellation mapping table 562 that maps the input signal to a constellation point 554 in a constellation map. In one example, a particular UC 560 can be associated with more than one code rate. In one example, a particular UC 560 is associated with code rate_1 564 and code rate_2 565. In another example, a particular UC 560 is associated with code rate_1 564, code rate_2 565, and code rate_3 566, etc.).

UCs 560 can include one or more constellation mapping tables 562. Each UC 560 can be implemented with an associated constellation mapping table 562 that maps the input signal 552 to a constellation point 554 in a constellation map. In one example, a particular UC 560 can be associated with more than one code rate. In one example, a particular UC 560 is associated with code rate_1 564 and code rate_2 565. In another example, a particular UC is associated with code rate_1 564, code rate_2 565, and code rate_3 566, etc.).

NUCs 570 can include one-dimensional (1D) constellation mapping tables 572 and two-dimensional (2D) constellation mapping tables 573. A NUC 570 can be implemented with an associated constellation mapping table 572 or 573 that maps the input signal 552, 556 to a constellation point 554, 558 in a constellation map. In one example, each code rate is associated with a particular NUC 570. In one example, a first NUC 570 is associated with code rate_1 574 and a second NUC 570 is associated with code rate_2 575. In another example, a first NUC 570 is associated with code rate_1 574, a second NUC 570 is associated with code rate_2 575, and a third NUC 570 is associated code rate_3 576.

FIG. 6 shows a block diagram of an example apparatus for demodulating a 4096 Quadrature Amplitude De-Modulation (4096-QAM) modulated signal or a 16384 Quadrature Amplitude Modulation (16384-QAM) modulated signal according to another example. The Quadrature Amplitude De-Modulator 600 includes a 4096-QAM De-Modulation Unit 610 for performing demodulation of 4096 Quadrature Amplitude Modulation modulated signals (e.g., signals 612, 616 also referred to herein as QAM modulated signals) that are received from a previous processing block and a 16384-QAM De-Modulation Unit 650 for performing demodulation of 4096 Quadrature Amplitude Modulation modulated signals (e.g., signals 652, 656 also referred to herein QAM modulated signals) received from a previous processing block. UCs 660 and NUCs 670 includes the constellation mapping table used on the transmit side to modulate the original signal. The same constellation mapping table (e.g., 662, 672, 673) is utilized to demodulate the QAM modulated signal to recover the original signal.

4096 QAM and 16384 QAM can utilize Non-uniform constellations (NUCs). There is a 1-D NUC for 16 QAM, a 2-D NUC for 16 QAM, and a NUC for 4096-QAM. In one example, one dimensional NUCs (1D-NUCs) are used for 4096QAM and 16384QAM in order to limit the complexity at the receiver side. One dimensional NUCs (1D-NUCs) are characterized by a high level of symmetry. In one example, for one dimensional NUCs (1D-NUCs), amplitude levels of real part and imaginary part are the same. For one dimensional NUCs (1D-NUCs), the bit labels of real part and imaginary part can be separated. For 4096 QAM and 16384 QAM, in one example one dimensional NUCs (1D-NUCs) have constellation points that are compressed around origin, but are spread out or have larger distance at the edges.

Two dimensional NUCs (2D-NUCs) are characterized by quadrant symmetry. In one example, for two dimensional NUCs (2D-NUCs), amplitude levels of real part and imaginary part are independent. For one dimensional NUCs (1D-NUCs), the bit labels of real part and imaginary part cannot be separated. For 4096 QAM and 16384 QAM, in one example, there is a need for a different NUC for each code rate.

There are several design considerations when deciding between UCs and NUCs. One consideration is that NUCs need to be optimized for each code rate. In this regard, a new code rate would need a new design even with the same constellation points. Consequently, NUCs from other communication standards may not be able to be re-used in Wi-Fi if a different code rate is desired. On the other hand, as compared to UCs, NUCs improve sensitivity and relax the requirements on implementation. However, NUCs have higher complexity than UCs in general. The use of 1D-NUCs provides a good trade-off between performance gain and de-mapper complexity. The de-mapper for 1D-NUCs is similar to that for UCs, but may need a separate bit mapping table for I and Q LLRs generation, hard decision block and optimal search window. The error distance extrapolation may need a change to account for uneven boundary. Also, more bits are needed to represent the NUC. 2D-NUCs have higher complexity than 1D NUCs.

FIG. 7 shows a flowchart 700 illustrating an exemplary partial process for 4096 Quadrature Amplitude Modulation (4096-QAM) with Uniform Constellations or Non-uniform constellations or 16384 Quadrature Amplitude Modulation (16384-QAM) with Uniform Constellations or Non-uniform constellations according to some implementations. In step 702, a signal for quadrature amplitude modulation is received. For 4096-QAM, the input signal can be 12 bits in length, and for 16384-QAM, the input signal can be 14 bits in length, The signal to be modulated can be received from a forward error correction (FEC) block, such as a FEC block implementing a low density parity check (LDPC) code or a turbo code or other code for error correction or channel coding. In step 704, the received signal is modulated by using 4096 Quadrature Amplitude Modulation (4096-QAM) with a uniform constellation (UC) or a non-uniform constellation (NUC) to generate a modulated signal. Alternatively, the received signal is modulated by using 16384 Quadrature Amplitude Modulation (16384-QAM) with uniform constellation (UC) or a non-uniform constellation (NUC) to generate a modulated signal. It is noted that a particular constellation mapping table is utilized to modulate the received signal. The constellation mapping table can be associated with 4096-QAM or 16384-QAM and is used to generate a constellation point (which can, for example, have an in phase component (I) and a quadrature component (Q)) from the received input signal. The constellation mapping table can be associated with a uniform constellation or a non-uniform constellation, which can, for example, by one dimensional or two dimensional. For a particular code rate, there may be a specific constellation mapping table associated therewith or two or more code rates can share the same constellation mapping table. In step 706, the modulated signal is provided to a next processing block, which can be, for example, a space time block code (STBC) unit for providing diversity gain.

FIG. 8 shows a flowchart 800 illustrating an example process for demodulating a 4096 Quadrature Amplitude Modulation (4096-QAM) modulated signal or a 16384 Quadrature Amplitude Modulation (16384-QAM) modulated signal according to some implementations. In step 810, a 4096-QAM modulated signal or a 16384-QAM modulated signal is received for de-modulation. In step 820, the received signal is de-modulated by using 4096 Quadrature Amplitude Modulation (4096-QAM) that uses a uniform constellation (UC) or a non-uniform constellation (NUC) or 16384 Quadrature Amplitude Modulation (16384-QAM) that uses a uniform constellation (UC) or a non-uniform constellation (NUC) to generate a recovered signal. It is noted that a particular constellation mapping table is utilized to recover the pre-modulated signal. The constellation mapping table can be associated with 4096-QAM or 16384-QAM and is the same table that was used on the transmit side to generate a constellation point from the input signal. The constellation mapping table can be associated with a uniform constellation or a non-uniform constellation, which can, for example, by one dimensional or two dimensional. For a particular code rate, there may be a specific constellation mapping table associated therewith or two or more code rates can share a constellation mapping table. In step 830, the recovered signal is provided to a next processing block.

The 802.11ax specification includes a figure that illustrates a transmitter block diagram for the Data field of an HE SU transmission with LDPC encoding. Certain blocks may be altered or configured in a manner to accommodate 4096 QAM and 16384QAM. After the Stream Parser that generates N_SS spatial streams, there is a constellation mapper for each stream. In one example, the constellation mapper employs one of the constellation mapping tables described previously that is associated with a uniform constellation (UC) or non-uniform constellation (NUC) for 4096 QAM with code rates 3/4, 5/6, 7/8 or 16384 QAM with code rates 3/4, 5/6, 7/8. It is noted that the DCM Tone Mapper can be removed from the transmitter, and the output of the constellation mapper can be provided directly to the LDPC Tone Mapper, which acts as an interleaver.

Space-time block coding (STBC) is the utilized to provide diversity gain. This section operates on N_STS space time streams. STBC is a technique used in wireless communications to transmit multiple copies of a data stream across a number of antennas and to use the various received versions of the data to improve the reliability of the data transmitted.

In the transmit chain section, there is an Analog and RF block. The power amplifier (PA) backoffs may need to be set higher for the 4096 QAM and 16384 QAM. In one example, the PA backoff may need to be set a few dBs higher than other MCSs. Furthermore, phase noise levels may need to be reduced. In one example, the phase noise levels may be reduced a couple of dBs lower than the QAM, supported in 802.11ax (e.g., 1024 QAM) in order to support 4096 QAM and 16384 QAM.

Table II illustrates relative constellation error allowed for the higher order QAM proposed above. It is noted that there are other transmitter or receiver requirements that are not mentioned below that may be impacted with higher order QAM. For example, the below requirements are examples of error vector magnitude (EVM), which is also referred to as receive constellation error (RCE). The EVM is a measure used to quantify the performance of a digital radio transmitter or receiver.

In one example, for 4096-QAM, the relative constellation error is 6 dB lower than for corresponding 1024 QAM with the same code rate. In another example, for 16384-QAM, the relative constellation error is 12 dB lower than for corresponding 1024 QAM with the same code rate.

In one example, for 4096-QAM, the required receiver sensitivity levels is 6 dB (in dBm) lower than for corresponding 1024 QAM with the same code rate. In another example, for 16384-QAM, the required receiver sensitivity levels is 12 dB (in dBm) lower than for corresponding 1024 QAM with the same code rate.

In one example, for 4096-QAM, the minimum required adjacent and nonadjacent channel rejection levels (also referred to as blocker requirements) is 6 dB lower than for corresponding 1024 QAM with the same code rate. In another example, for 16384-QAM, the minimum required adjacent and nonadjacent channel rejection levels is 12 dB lower than for corresponding 1024 QAM with the same code rate. It is noted that the minimum required adjacent and nonadjacent channel rejection levels may be MCS dependent. It is noted that an advanced receiver design or the use of additional antennas for transmit beam forming (TxBF) can relax these requirements.

TABLE II

| Modulation | Code rate | Relative constellation error allowed (dB) |
|---|---|---|
| 1024 QAM | 3/4 | −35 |
| 1024 QAM | 5/6 | −35 |
| 4096 QAM | 3/4 | −41 |
| 4096 QAM | 5/6 | −41 |
| 4096 QAM | 7/8 | −41 |
| 16384 QAM | 3/4 | −47 |
| 16384 QAM | 5/6 | −47 |
| 16384 QAM | 7/8 | −47 |

Figure 9:
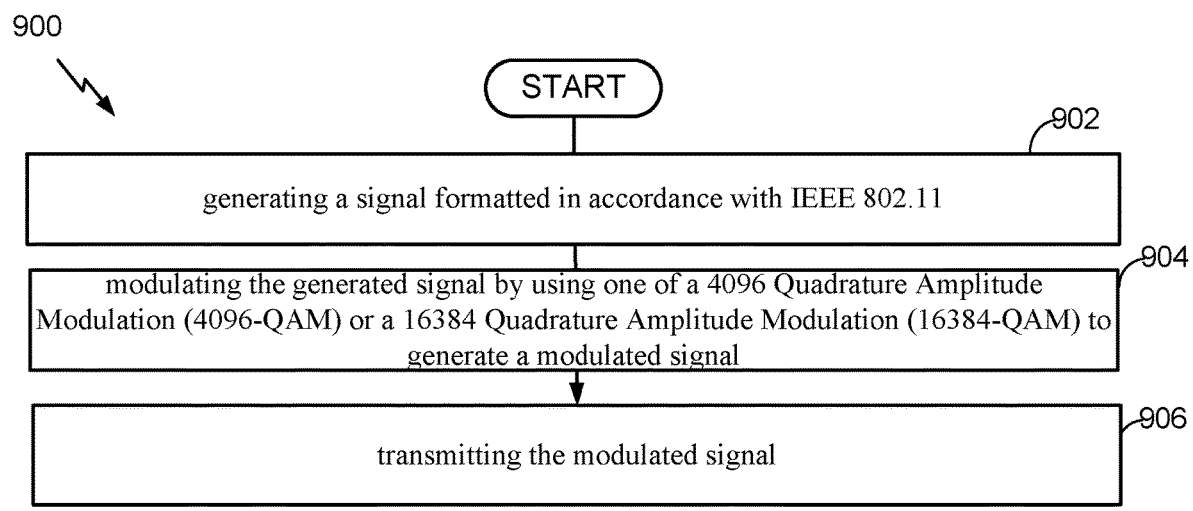
FIG. 9 illustrates an exemplary partial process for wireless communication in accordance with some examples of the disclosure.

FIG. 9 illustrates an exemplary partial process for wireless communication in accordance with some examples of the disclosure. As shown in FIG. 9, a partial process 900 begins in block 902 with generating a signal formatted in accordance with IEEE 802.11. The partial process 900 continues in block 904 with modulating the generated signal by using one of a 4096 Quadrature Amplitude Modulation (4096-QAM) or a 16384 Quadrature Amplitude Modulation (16384-QAM) to generate a modulated signal. The partial process 900 may conclude in block 906 with transmitting the modulated signal. In addition, the partial process may include demodulation of a signal modulated in accordance with the partial process 900. For example, another partial process for demodulation may include: receiving a signal formatted in accordance with IEEE 802.11; demodulating the received signal with one of a 4096 Quadrature Amplitude Modulation (4096-QAM) or a 16384 Quadrature Amplitude Modulation (16384-QAM) to generate at least one frame; and process the at least one frame.

Figure 10:
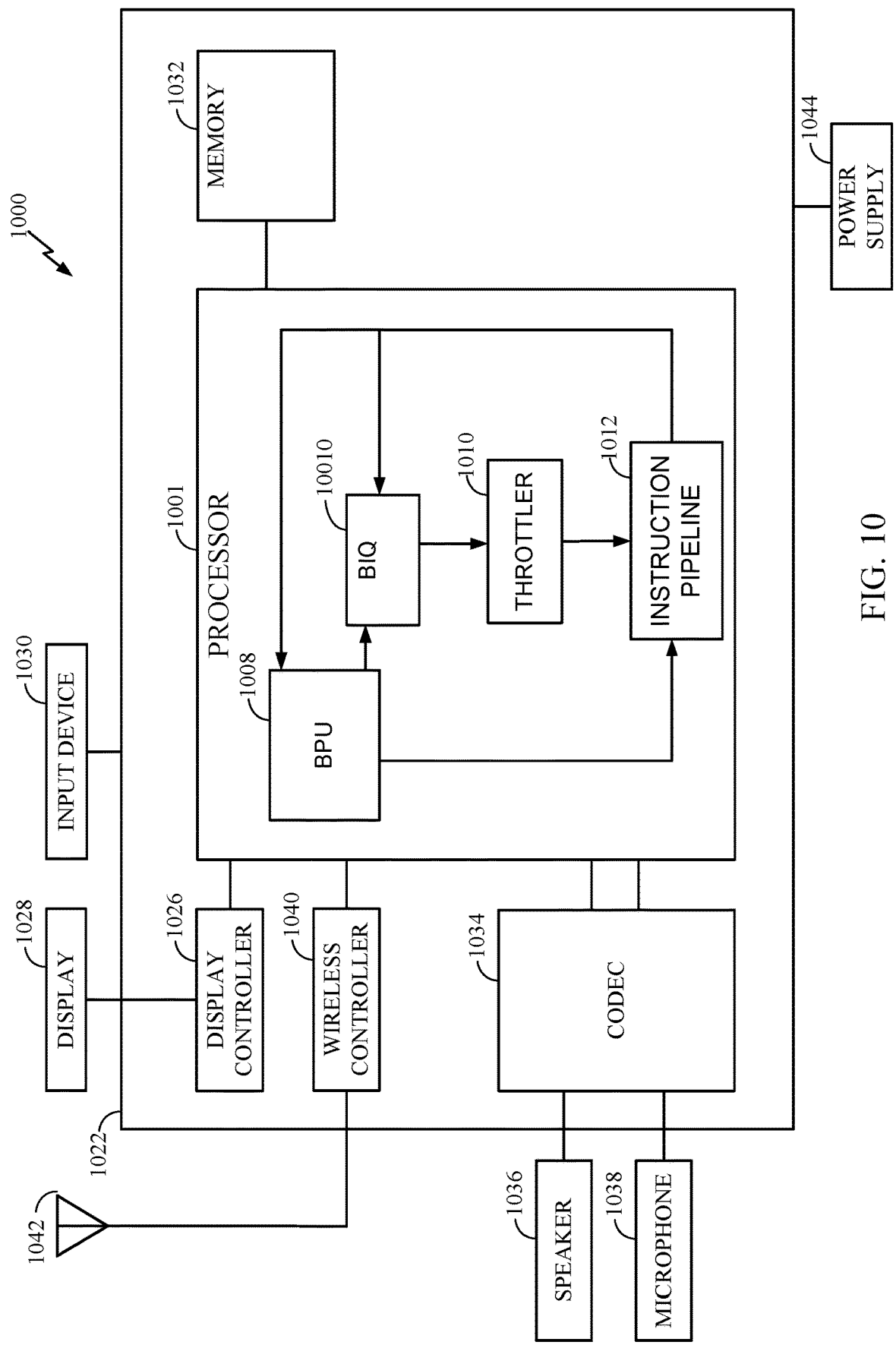
FIG. 10 illustrates an exemplary mobile device in accordance with some examples of the disclosure.

FIG. 10 illustrates an exemplary mobile device in accordance with some examples of the disclosure. Referring now to FIG. 10, a block diagram of a mobile device that is configured according to exemplary aspects is depicted and generally designated 1000. In some aspects, mobile device 1000 may be configured as a wireless communication device. As shown, mobile device 1000 includes processor 1001, which may be configured to implement the methods described herein in some aspects. Processor 1001 is shown to comprise instruction pipeline 1012, buffer processing unit (BPU) 1008, branch instruction queue (BIQ) 10010, and throttler 1010 as is well known in the art. Other well-known details (e.g., counters, entries, confidence fields, weighted sum, comparator, etc.) of these blocks have been omitted from this view of processor 1001 for the sake of clarity.

Processor 1001 may be communicatively coupled to memory 1032 over a link, which may be a die-to-die or chip-to-chip link. Mobile device 1000 also include display 1028 and display controller 1026, with display controller 1026 coupled to processor 1001 and to display 1028.

In some aspects, FIG. 10 may include coder/decoder (CODEC) 1034 (e.g., an audio and/or voice CODEC) coupled to processor 1001; speaker 1036 and microphone 1038 coupled to CODEC 1034; and wireless controller 1040 (which may include a modem) coupled to wireless antenna 1042 and to processor 1001.

In a particular aspect, where one or more of the above-mentioned blocks are present, processor 1001, display controller 1026, memory 1032, CODEC 1034, and wireless controller 1040 can be included in a system-in-package or system-on-chip device 1022. Input device 1030 (e.g., physical or virtual keyboard), power supply 1044 (e.g., battery), display 1028, input device 1030, speaker 1036, microphone 1038, wireless antenna 1042, and power supply 1044 may be external to system-on-chip device 1022 and may be coupled to a component of system-on-chip device 1022, such as an interface or a controller.

It should be noted that although FIG. 10 depicts a mobile device, processor 1001 and memory 1032 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 11:
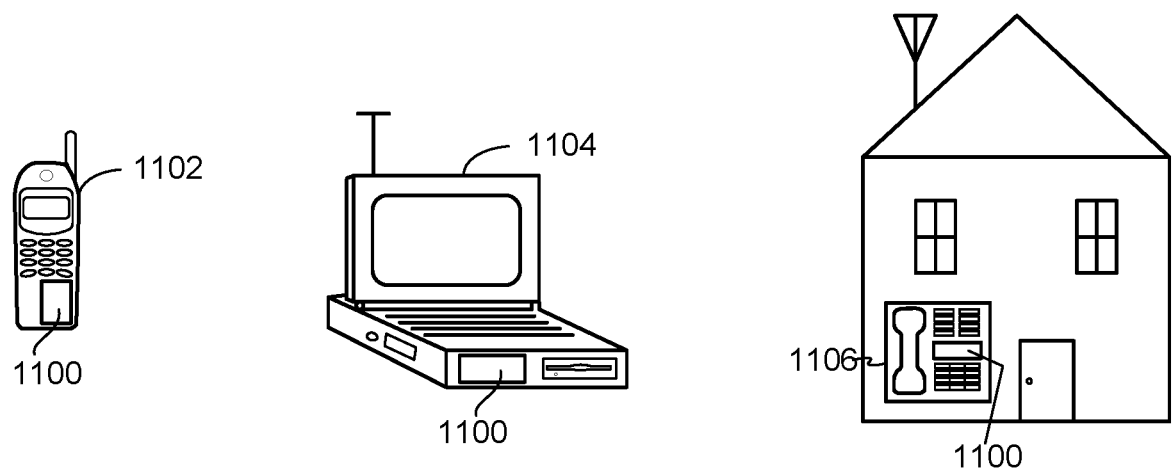
FIG. 11 illustrates various electronic devices that may be integrated with any of the aforementioned integrated device, semiconductor device, integrated circuit, die, interposer, package or package-on-package (PoP) in accordance with some examples of the disclosure.

FIG. 11 illustrates various electronic devices that may be integrated with any of the aforementioned integrated device, semiconductor device, integrated circuit, die, interposer, package or package-on-package (PoP) in accordance with some examples of the disclosure. For example, a mobile phone device 1102, a laptop computer device 1104, and a fixed location terminal device 1106 may include an integrated device 1100 as described herein. The integrated device 1100 may be, for example, any of the integrated circuits, dies, integrated devices, integrated device packages, integrated circuit devices, device packages, integrated circuit (IC) packages, package-on-package devices described herein. The devices 1102, 1104, 1106 illustrated in FIG. 11 are merely exemplary. Other electronic devices may also feature the integrated device 1100 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

One or more of the components, processes, features, and/or functions illustrated in FIGS. 1-11 may be rearranged and/or combined into a single component, process, feature or function or incorporated in several components, processes, or functions. Additional elements, components, processes, and/or functions may also be added without departing from the disclosure. It should also be noted that FIGS. 1-11 and its corresponding description in the present disclosure is not limited to dies and/or ICs. In some implementations, FIGS. 1-11 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A wireless communication device comprising:
   at least one antenna;
   a processor;

a memory communicatively coupled with the processor, the memory stores processor-readable code that, when executed by the processor, causes the wireless communication device to:
generate a signal formatted in accordance with IEEE 802.11;
modulate the generated signal with one of a 4096 Quadrature Amplitude Modulation (4096-QAM) or a 16384 Quadrature Amplitude Modulation (16384-QAM) to generate a modulated signal;
transmit the modulated signal;
wherein the modulate the generated signal comprises use of a constellation map with a uniform constellation that associates the generated signal with a constellation point; and
wherein the generated signal is modulated with 4096-QAM and an allowable relative constellation error is −41 dB.

2. A wireless communication device comprising:
at least one antenna;
a processor;
a memory communicatively coupled with the processor, the memory stores processor-readable code that, when executed by the processor, causes the wireless communication device to:
generate a signal formatted in accordance with IEEE 802.11;
modulate the generated signal with one of a 4096 Quadrature Amplitude Modulation (4096-QAM) or a 16384 Quadrature Amplitude Modulation (16384-QAM) to generate a modulated signal;
transmit the modulated signal;
wherein the modulate the generated signal comprises use of a constellation map with a uniform constellation that associates the generated signal with a constellation point; and
wherein the generated signal is modulated with 16384-QAM and an allowable relative constellation error is −47 dB.

3. A wireless communication device comprising:
at least one antenna;
a processor;
a memory communicatively coupled with the processor, the memory stores processor-readable code that, when executed by the processor, causes the wireless communication device to:
generate a signal formatted in accordance with IEEE 802.11;
modulate the generated signal with one of a 4096 Quadrature Amplitude Modulation (4096-QAM) or a 16384 Quadrature Amplitude Modulation (16384-QAM) to generate a modulated signal;
transmit the modulated signal;
wherein the modulate the generated signal comprises use of a constellation map with a non-uniform constellation that associates the generated signal with a constellation point; and
wherein the constellation map comprises a first constellation map employed for a first code rate and a second constellation map employed for a second code rate; and wherein the first constellation map is customized for the first code rate and wherein the second constellation map is customized for the second code rate.

4. A wireless communication device comprising:
at least one antenna;
a processor;
a memory communicatively coupled with the processor, the memory stores processor-readable code that, when executed by the processor, causes the wireless communication device to:
generate a signal formatted in accordance with IEEE 802.11;
modulate the generated signal with one of a 4096 Quadrature Amplitude Modulation (4096-QAM) or a 16384 Quadrature Amplitude Modulation (16384-QAM) to generate a modulated signal;
transmit the modulated signal;
wherein the modulate the generated signal comprises use of a constellation map with a non-uniform constellation that associates the generated signal with a constellation point; and
wherein the constellation map comprises a first constellation map employed for a first code rate and a second constellation map employed for a second code rate and a third constellation map employed for a third code rate; and wherein the first constellation map is customized for the first code rate and wherein the second constellation map is customized for the second code rate and wherein the third constellation map is customized for the third code rate.

5. A wireless communication device comprising:
at least one antenna;
a processor;
a memory communicatively coupled with the processor, the memory stores processor-readable code that, when executed by the processor, causes the wireless communication device to:
generate a signal formatted in accordance with IEEE 802.11;
modulate the generated signal with one of a 4096 Quadrature Amplitude Modulation (4096-QAM) or a 16384 Quadrature Amplitude Modulation (16384-QAM) to generate a modulated signal;
transmit the modulated signal; and
wherein the wireless communication device is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

6. A wireless communication device comprising:
a plurality of antennas;
a processor;
a memory communicatively coupled with the processor, the memory stores processor-readable code that, when executed by the processor, causes a wireless access point to:
receive a signal formatted in accordance with IEEE 802.11;
demodulate the received signal with one of a 4096 Quadrature Amplitude Modulation (4096-QAM) or a 16384 Quadrature Amplitude Modulation (16384-QAM) to generate at least one frame;
process the at least one frame;
wherein the demodulate the received signal comprises use of a constellation map with a uniform constellation that associates the received signal with a constellation point wherein the generated signal is modulated with 4096-QAM and an allowable relative constellation error is −41 dB; and wherein the generated signal is modulated with 16384-QAM and an allowable relative constellation error is −47 dB.

7. A wireless communication device comprising:
a plurality of antennas;
a processor;
a memory communicatively coupled with the processor, the memory stores processor-readable code that, when executed by the processor, causes a wireless access point to:
receive a signal formatted in accordance with IEEE 802.11;
demodulate the received signal with one of a 4096 Quadrature Amplitude Modulation (4096-QAM) or a 16384 Quadrature Amplitude Modulation (16384-QAM) to generate at least one frame;
process the at least one frame;
wherein the demodulate the received signal comprises use of a constellation map with a non-uniform constellation that associates the received signal with a constellation point;
wherein the constellation map comprises a first constellation map employed for a first code rate and a second constellation map employed for a second code rate; and wherein the first constellation map is customized for the first code rate and wherein the second constellation map is customized for the second code rate; and
wherein the constellation map comprises a first constellation map employed for a first code rate and a second constellation map employed for a second code rate and a third constellation map employed for a third code rate; and wherein the first constellation map is customized for the first code rate and wherein the second constellation map is customized for the second code rate and wherein the third constellation map is customized for the third code rate.

8. A wireless communication device comprising:
a plurality of antennas;
a processor;
a memory communicatively coupled with the processor, the memory stores processor-readable code that, when executed by the processor, causes a wireless access point to:
receive a signal formatted in accordance with IEEE 802.11;
demodulate the received signal with one of a 4096 Quadrature Amplitude Modulation (4096-QAM) or a 16384 Quadrature Amplitude Modulation (16384-QAM) to generate at least one frame;
process the at least one frame; and
wherein the wireless communication device is incorporated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

9. A method for wireless communication, the method comprising:
generating a signal formatted in accordance with IEEE 802.11;
modulating the generated signal by using one of a 4096 Quadrature Amplitude Modulation (4096-QAM) or a 16384 Quadrature Amplitude Modulation (16384-QAM) to generate a modulated signal;
transmitting the modulated signal;
wherein the modulating the generated signal comprises using a constellation map having a uniform constellation that associates the generated signal with a constellation point; and
wherein the generated signal is modulated with 4096-QAM and an allowable relative constellation error is −41 dB.

10. A method for wireless communication, the method comprising:
generating a signal formatted in accordance with IEEE 802.11;
modulating the generated signal by using one of a 4096 Quadrature Amplitude Modulation (4096-QAM) or a 16384 Quadrature Amplitude Modulation (16384-QAM) to generate a modulated signal;
transmitting the modulated signal;
wherein the modulating the generated signal comprises using a constellation map having a uniform constellation that associates the generated signal with a constellation point; and
wherein the generated signal is modulated with 16384-QAM and an allowable relative constellation error is −47 dB.

11. A method for wireless communication, the method comprising:
generating a signal formatted in accordance with IEEE 802.11;
modulating the generated signal by using one of a 4096 Quadrature Amplitude Modulation (4096-QAM) or a 16384 Quadrature Amplitude Modulation (16384-QAM) to generate a modulated signal;
transmitting the modulated signal;
wherein the modulating the generated signal comprises using a constellation map having a non-uniform constellation that associates the generated signal with a constellation point;
wherein the constellation map comprises a first constellation map employed for a first code rate and a second constellation map employed for a second code rate; and
wherein the first constellation map is customized for the first code rate and wherein the second constellation map is customized for the second code rate.

12. A method for wireless communication, the method comprising:
generating a signal formatted in accordance with IEEE 802.11;
modulating the generated signal by using one of a 4096 Quadrature Amplitude Modulation (4096-QAM) or a 16384 Quadrature Amplitude Modulation (16384-QAM) to generate a modulated signal;
transmitting the modulated signal;
wherein the modulating the generated signal comprises using a constellation map having a non-uniform constellation that associates the generated signal with a constellation point; and
wherein the constellation map comprises a first constellation map employed for a first code rate and a second constellation map employed for a second code rate and a third constellation map employed for a third code rate; and wherein the first constellation map is customized for the first code rate and wherein the second constellation map is customized for the second code rate and wherein the third constellation map is customized for the third code rate.

13. A non-transitory computer-readable storage medium comprising non-transitory processor-executable code operable to:
- generate a signal formatted in accordance with IEEE 802.11;
- modulate the generated signal with one of a 4096 Quadrature Amplitude Modulation (4096-QAM) or a 16384 Quadrature Amplitude Modulation (16384-QAM) to generate a modulated signal;
- transmit the modulated signal;
- wherein the modulate the generated signal comprises use of a constellation map with a uniform constellation that associates the generated signal with a constellation point; and
- wherein the generated signal is modulated with 4096-OAM and an allowable relative constellation error is −41 dB.

14. A non-transitory computer-readable storage medium comprising non-transitory processor-executable code operable to:
- generate a signal formatted in accordance with IEEE 802.11;
- modulate the generated signal with one of a 4096 Quadrature Amplitude Modulation (4096-QAM) or a 16384 Quadrature Amplitude Modulation (16384-QAM) to generate a modulated signal;
- transmit the modulated signal;
- wherein the modulate the generated signal comprises use of a constellation map with a uniform constellation that associates the generated signal with a constellation point; and
- wherein the generated signal is modulated with 16384-OAM and an allowable relative constellation error is −47 dB.

15. A non-transitory computer-readable storage medium comprising non-transitory processor-executable code operable to:
- generate a signal formatted in accordance with IEEE 802.11;
- modulate the generated signal with one of a 4096 Quadrature Amplitude Modulation (4096-QAM) or a 16384 Quadrature Amplitude Modulation (16384-QAM) to generate a modulated signal;
- transmit the modulated signal;
- wherein the modulate the generated signal comprises use of a constellation map with a non-uniform constellation that associates the generated signal with a constellation point;
- wherein the constellation map comprises a first constellation map employed for a first code rate and a second constellation map employed for a second code rate; and
- wherein the first constellation map is customized for the first code rate and wherein the second constellation map is customized for the second code rate.

16. A non-transitory computer-readable storage medium comprising non-transitory processor-executable code operable to:
- generate a signal formatted in accordance with IEEE 802.11;
- modulate the generated signal with one of a 4096 Quadrature Amplitude Modulation (4096-QAM) or a 16384 Quadrature Amplitude Modulation (16384-QAM) to generate a modulated signal;
- transmit the modulated signal;
- wherein the modulate the generated signal comprises use of a constellation map with a non-uniform constellation that associates the generated signal with a constellation point;
- wherein the constellation map comprises a first constellation map employed for a first code rate and a second constellation map employed for a second code rate and a third constellation map employed for a third code rate; and
- wherein the first constellation map is customized for the first code rate and wherein the second constellation map is customized for the second code rate and wherein the third constellation map is customized for the third code rate.

\* \* \* \* \*